Oct. 3, 1961  V. RAWLS  3,002,223
APPARATUS FOR HANDLING CURING TUBES
Filed April 20, 1959  3 Sheets-Sheet 1

INVENTOR.
VAUGHN RAWLS
BY
Owen & Owen
ATTORNEYS

Oct. 3, 1961    V. RAWLS    3,002,223
APPARATUS FOR HANDLING CURING TUBES
Filed April 20, 1959    3 Sheets-Sheet 2
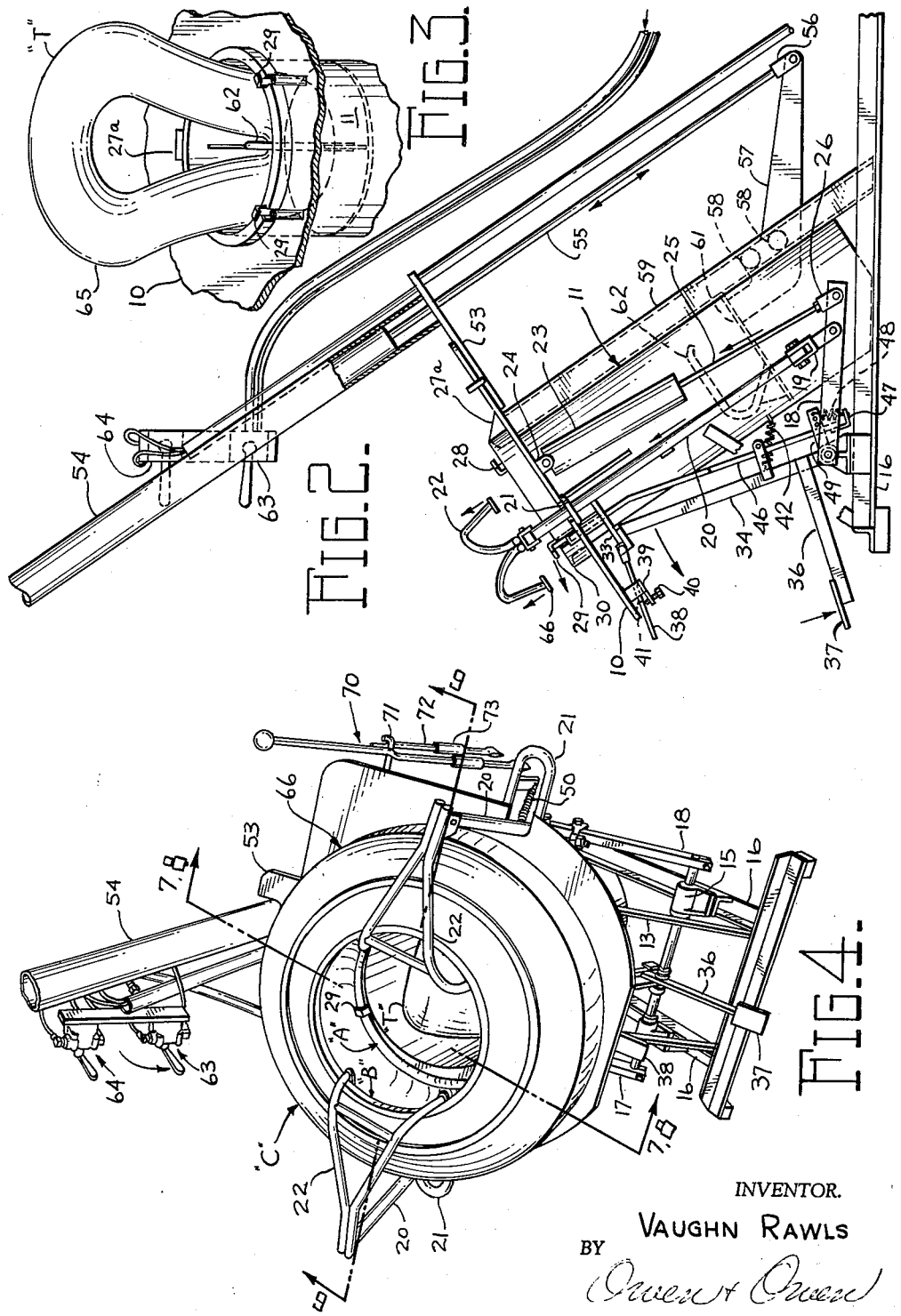
INVENTOR.
VAUGHN RAWLS
BY
*Owen & Owen*
ATTORNEYS

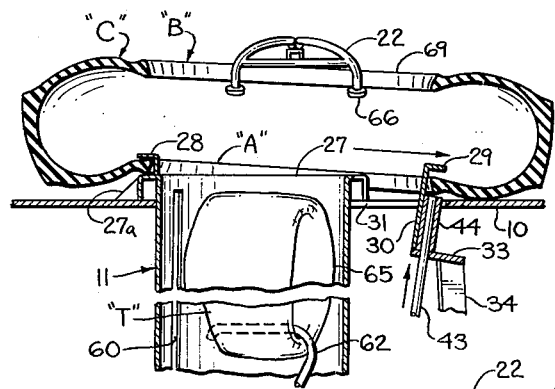
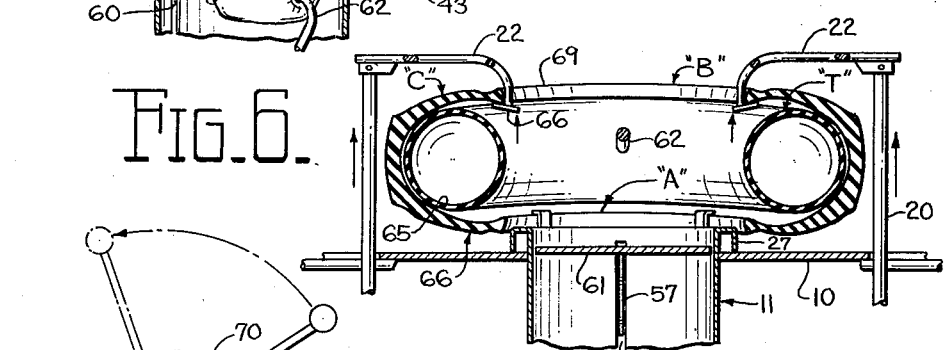
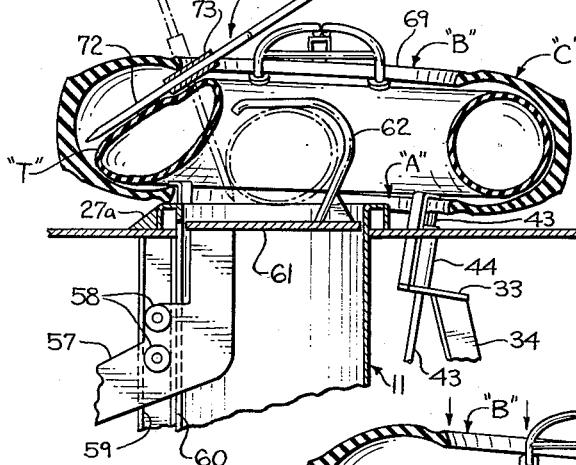
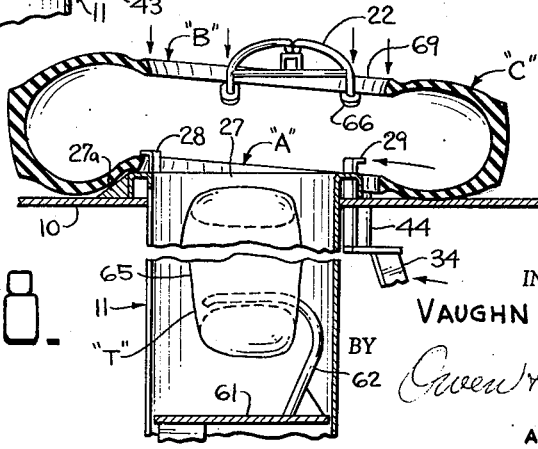
INVENTOR.
VAUGHN RAWLS

United States Patent Office 3,002,223
Patented Oct. 3, 1961

3,002,223
APPARATUS FOR HANDLING CURING TUBES
Vaughn Rawls, Lima, Ohio, assignor to Rawls Brothers Company, Lima, Ohio, a corporation of Ohio
Filed Apr. 20, 1959, Ser. No. 807,690
4 Claims. (Cl. 18—2)

This invention relates to apparatus for handling curing tubes and more particularly for removing such tubes from and facilitating the insertion of such tubes into pneumatic tire casings and is designed for use particularly in tire recapping or retreading shops.

When the casing of a pneumatic tire is recapped or retreaded, it is buffed down to remove the old tread stock, new tread rubber is "stitched" on its tread area and it is inserted in a mold to form the new tread and to vulcanize the new tread stock to the old rubber of the casing. In order to provide pressure for forcing the new tread rubber into the grooves of the tire mold, a curing tube, sometimes called a "bag," is inserted into the casing before it is placed in the mold. An annular metal, rim-like member is also inserted just inside the rim beads of the casing, or over such beads, closing the annular space therebetween, to support the inner wall of the curing tube.

Because a pressure of, say, 120 to 160 p.s.i. in the curing tube is necessary to force the new tread rubber into the mold, the curing tubes are made of heavy rubber with a wall about ¼" thick. The insertion of such a heavy, stiff, curing tube into a casing before the casing is placed in the mold and the removal of the curing tube after vulcanization of the new tread stock are both jobs requiring considerable force. Not only must the rim beads of the casing be separated from each other to provide an annular space through which the tube can either be inserted or removed, but considerable force is required to collapse the tube radially inwardly upon itself and to force it into the interior of the casing as well as to pull it out of the casing, both movements being through the relatively small space which can be provided by separating the rim beads axially.

It is an object of this invention to provide a machine which spreads the rim beads of a tire casing from each other under power and which has power means for grasping and holding a curing tube to facilitate its insertion into a casing and its removal therefrom.

It is a further object of the invention to provide a tube removal machine which stores a curing tube removed previously from a tire casing in a convenient place and in a collapsed form so that it can be readily inserted into a subsequent tire casing.

It is yet another object of the instant invention to provide an apparatus having means for positively holding a tire casing in place during the removal of a curing tube from the casing, after the casing has been retreaded, in order to prevent damage to the tube during such removal.

These and other more specific objects and advantages of the invention will be apparent from the following detailed description, and from the accompanying drawings, in which:

FIG. 2 is a fragmentary side view in elevation, with parts broken away, of the apparatus shown in FIG. 1;

FIG. 3 is a fragmentary, front view in perspective, showing a curing tube being collapsed together and initially drawn into the tube storage compartment of a machine embodying the invention;

FIG. 4 is a fragmentary view in perspective of a machine embodying the invention and showing a pneumatic tire casing mounted on the machine in position to receive a curing tube;

FIG. 5 is a fragmentary, vertical, sectional view taken along the line 5—5 of FIG. 1 and illustrating the apparatus in one stage of its operation;

FIG. 6 is a view similar to FIG. 5 but taken along the line 6—6 of FIG. 4 and showing the apparatus in another stage of operation;

Figure 1:
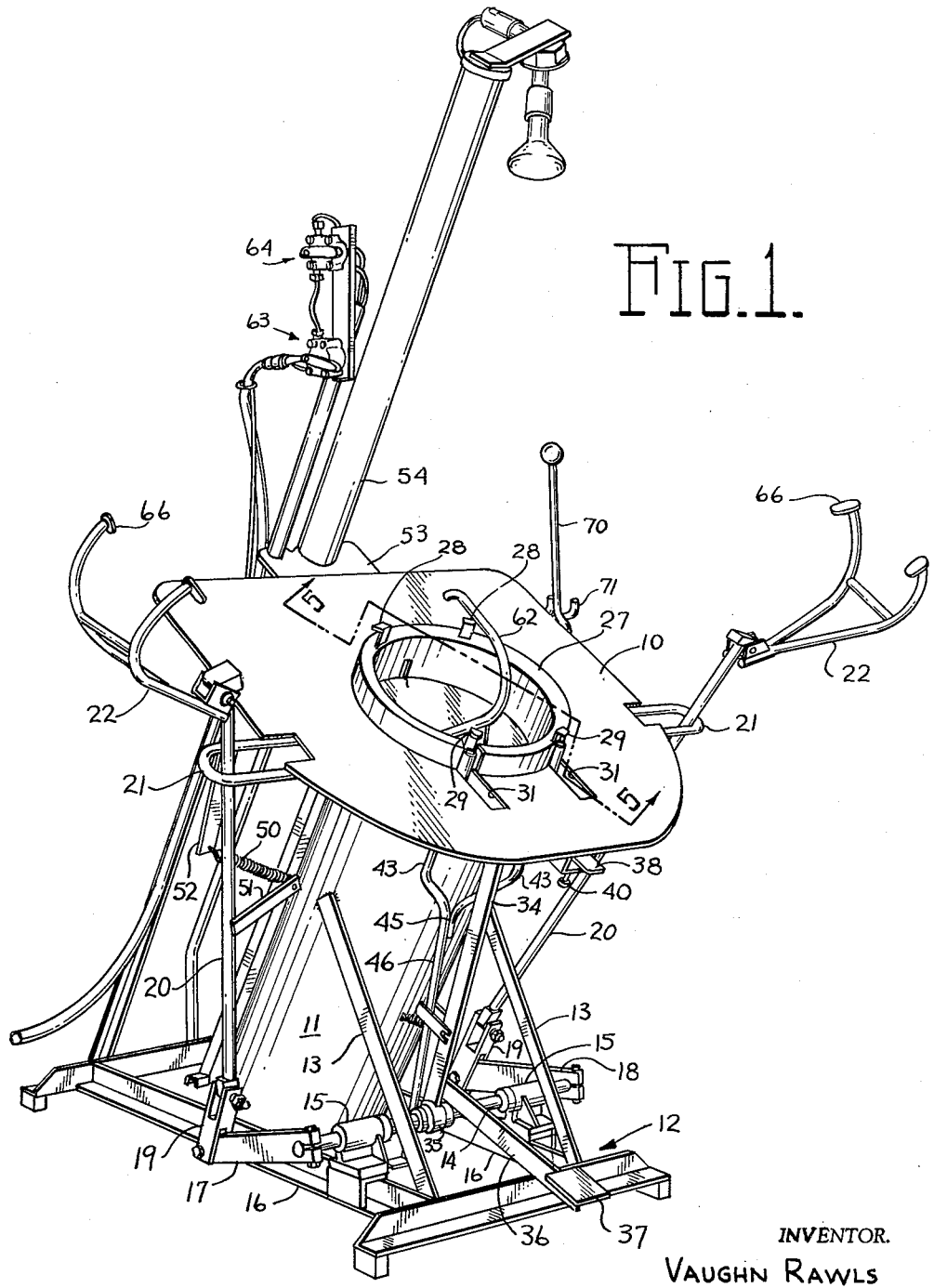
FIG. 1 is a view in perspective of an apparatus embodying the instant invention.

FIG. 7 is a view similar to FIGS. 5 and 6, but taken along the line 7—7 of FIG. 4, and FIG. 8 is a view similar to FIG. 7 and taken along the same section line 8—8 of FIG. 4, but showing the apparatus in a subsequent stage of operation.

An apparatus embodying the invention has an inclined table 10 welded or otherwise secured on the upper end of a cylinder generally indicated at 11 which forms a main structural portion of the apparatus, and in its hollow interior provides a storage compartment for a curing tube in collapsed condition. The cylinder 11 is rigidly mounted on a base frame 12 by a plurality of struts 13, the cylinder 11 being inclined forwardly as can best be seen in FIG. 2.

A rock-shaft 14 extends across the frame 12 at the front and near the bottom of the cylinder 11, being mounted on the frame 12 for rocking movement by a pair of bearings 15 which are welded or otherwise secured to fore-and-aft angle irons 16 of the frame 12. A pair of levers 17 and 18 are adjustably clamped on the ends of the rock-shaft 14 and extend rearwardly therefrom. The two levers 17 and 18 are pivotally connected by transversely bifurcated yokes 19 to the bottom ends of a pair of thrust rods 20 which extend upwardly along the opposite sides of the cylinder 11 and through outwardly directed guides 21 which are welded to opposite sides of the table 10. A claw 22 is pivotally mounted on the upper end of each of the pull rods 20 for swinging movement between an open position shown in FIG. 2 and a closed or casing engaging position shown in FIG. 4. An air cylinder 23 (FIG. 2) is pivotally mounted at its upper end by an ear 24 which is welded to the under side of the table 10. A rod 25 of the cylinder 23 is connected by a clevis 26 to the rear end of the lever 18.

An annular rim 27 extends above the level of the table 10 at the upper end of the cylinder 11 and defines the upper open end of the tube-receiving chamber formed by the interior of the cylinder 11. A pair of bead catches 28 are located at the rear upper side of the rim 27 in position to be engaged over the lower rim bead "A" of a tire casing "C" placed on the table 10. A guide 28a is welded or otherwise positioned at the upper center of the rim 27 to guide the lower rim bead "A" of the tire casing "C" into engagement with the bead catches 28.

A second pair of bead catches 29 is located at the lower front side of the rim 27, but the bead catches 29 are movable in a radial direction in order to accommodate the rim beads of tires of differing rim diameters and to tightly engage such beads. The catches 29 are formed on the upper ends of a pair of bars 30 (see also FIGS. 2 and 5) which extend upwardly through slots 31 in the table 10 and through recesses 32 cut in the outer side of the rim 27. The bars 30 are rigidly welded to a cross-plate 33 which is carried on the upper end of a bar 34. The bar 34 is welded to a sleeve 35 rockingly mounted on the rock-shaft 14 and a pedal bar 36 is welded to the bar 34 and extends forwardly beyond the frame 12 with a foot pedal 37 attached to its front end. When the operator steps on the pedal 37, he rocks the pedal lever 36 and sleeve 35 forwardly, pulling the bead catches 29 forwardly and downwardly, radially relative to the tire casing "C," to move them into contact with and over the lower rim bead "A." A latch bar 38 (FIG. 2) is pivotally attached at the front side of the plate 33 and extends forwardly out from under the front edge of the table 10 through a U-latch 39. The latch 39 has an adjustable pin 40 which is adapted to engage in any one of a series of holes 41 drilled in the latch bar 38 as the bar 39 slides forwardly when the foot pedal 37 is depressed. The mechanism may be released by simply lifting the front edge of the latch bar 38. A spring 42 is engaged between the bar 34 and the front edge of the cylinder 11 to swing the bar 34 and the bead catches 29 inwardly and upwardly upon release of the latch bar 38.

As can best be seen by reference to FIGURE 5 even after the catches 29 are swung forwardly to engage the lower rim bead "A" of the tire casing "C," because the weight of the tire casing "C" causes it to lie down against the table 10. The catches 29 protrude upwardly beyond the lower rim bead "A" and into the annular space between the lower bead "A" and the upper bead "B" of the casing "C." When a curing tube "T," see FIG. 7, has been engaged for removal from the casing "C," if the catches 29 protruded into this space they would be engaged by and would damage the tube "T."

In order to eliminate this possibility of damage and, also, in order to securely hold the casing "C" in place, apparatus embodying the invention has a pair of rim bead locking pins 43 (see also FIG. 7) which are vertically slidable through tubular guides 44 welded to the plate 33. The locking pins 43 are bent inwardly and welded to each other at a position below the table 10 indicated by the reference number 45 in FIG. 1, and one of the pins 43 has an extension rod 46 which is connected by a finger 47 and spring 48 to a short arm 49 which is rigidly mounted on the rock-shaft 14.

Each of the thrust rods 20 is urged outwardly into the position shown in FIG. 1 by a spring 50 extending between an arm 51 welded to the thrust rod 20 and a bar 52 welded to and extending downwardly from the respective one of the guides 21. When the apparatus is not engaged with the tire casing "C," the springs 50 hold the thrust rods 20 in the outer, open position illustrated in FIG. 1 to retain them out of the way so that a tire casing can readily be placed on the table 10.

When the air cylinder 23 is actuated to draw in its piston rod 25, the lever 18 is swung upwardly and through the rock-shaft 14 also swings the lever 17 upwardly. This thrusts the rods 20 upwardly, raising the claws 22, and when in operative position, and engaged with the upper rim bead "B" of the tire casing "C" (see FIG. 4), spreading the rim beads "A" and "B" as will later be described. At the same time, the rocking motion of the rock-shaft 14 swings the arm 49, and through the spring 48 pulls upwardly on the finger 47, extension rod 46 and fingers 43 to force the lower rim bead "A" up against the bead catches 29 and to lock the bead "A" in place.

At the upper rear side of the table 10 there is welded an extension plate 53 which supports the lower end of an upwardly extending air cylinder 54. The air cylinder 54 has a downwardly extending piston rod 55 the lower end of which is connected by a clevis 56 to the rear end of a traveler 57. The traveler 57 is guided by rollers 58 (see also FIG. 7) which are engaged in a track 59 extending up the rear side of the cylinder 11. The inner end of the traveler 57 extends through a vertical slot 60 cut longitudinally through the cylinder 11 and is turned upwardly forming a support for a disk 61 to which it is welded. A tube hook 62 is mounted on the upper side of the disk 61, extending rearwardly in order to receive and engage a curing tube in the manner to be described below. When the air cylinder 54 is actuated to draw in its piston rod 55, the traveler 57 runs up the track 59 carrying the disk 61 and tube hook 62 to the upper end of the cylinder 11, and when the air cylinder 54 is actuated in the opposite direction its piston rod 55 is extended to pull the tube hook 62 and tube engaged therewith downwardly into the interior of the cylinder 11. Suitable air control valves 63 and 64 are mounted above the table 10 in position to be actuated by an operator for controlling the air cylinders 23 and 54, respectively.

In order to prepare for the insertion of a curing inner tube into a tire casing prior to a molding operation, the operator places the curing tube 65 (FIG. 3) on the table 10 around the rim 27. He actuates the proper valve to bring the tube hook 62 up into the position illustrated in FIGS. 1 and 3 and then engages the upper portion of the tube 65 beneath the hook 62. By then actuating the air cylinder 54, the tube hook 62 is drawn downwardly into the interior of the cylinder 11, pulling the curing tube 65 down into the chamber within the cylinder 11 and collapsing it inwardly against itself as it is pulled through the rim 27. The tire casing "C" is then placed on the table 10 and pulled downwardly toward the operator to engage its lower rim bead "A" (FIG. 5) with the rim catches 28. The operator then steps on the foot pedal 37 to move the rim catches 29 radially to the casing "C" as shown in FIG. 5, and flips the claws 22 over and inwardly so that fingers 66 on their inner ends engage beneath the upper rim bead "B." The operator then actuates the air cylinder 23 to thrust the claws 22 upwardly and, at the same time, to push the bead retaining fingers 43 up against the outer side of the lower rim bead "A," forcing the lower rim bead "A" up against the bead catches 29.

Upward movement of the claws 22 raises the upper rim bead "B," spreading the beads "A" and "B" away from each other as shown in FIG. 4. The operator then actuates the air cylinder 54 to move the tube hook 62 and disk 61 upwardly. This pushes the tube 65 upwardly through the rim 27 and the operator feeds the tube into the casing "C" through the spreaded opening between the rim beads "A" and "B." Because the tube "T" has been collapsed inside of the storage cylinder 11, it is presented to the operator in collapsed condition and its insertion into the casing is facilitated. The operator need not exert the substantial force necessary to collapse the tube together which would otherwise be required to permit its insertion. The operator then actuates the cylinder 23 to lower the claws 22 and swings them outwardly into the position of FIG. 1, so that the tire casing "C" with the inserted curing tube "T" can be removed from the table 10 and taken to the retreading mold.

After the molding operation is completed, the operator swings the retreaded tire casing "C" onto the table 10 and repeats the rim bead engaging procedures already described as well as re-engaging the claws 22 with the upper rim bead "B." At this point, the apparatus is in the position indicated in FIG. 6 with the claws 22 engaged with the upper rim bead "B" to spread the beads and the tube-engaging hook 62 in its upper position. The operator then takes a fork generally indicated at 70, which may be stored on a hook 71 welded to the table 10, and inserts its tines 72 between the tube "T" and the upper rim bead "B" of the tire casing. Each of the tines 72 of the fork 70 has a sliding sleeve 73 which the operator places against the surface of the upper rim bead. He then swings the fork 70 as shown in FIG. 7, to force the upper segment of the tube "T" inwardly and beneath the tube hook 62, holding the fork 70 in the position indicated by the dotted line in FIG. 7 and actuating the air cylinder 54. This pulls the tube hook 62 downwardly into the interior of the cylinder 11 and withdraws the tube from within the casing, collapsing it inwardly upon itself as it enters the storage chamber in the cylinder 11. However, because of the resiliency of the tube "T," the tines 72 of the fork 70 are tightly pressed against the upper bead "B" and the tines 72 are pulled downwardly during the initial downward movement of the tube. The fork 70 slides in its tine sleeves 73 during the initial part of this movement. The tine sleeves 73 thus prevent sliding movement of the fork 70 against the upper rim bead "B" and obviate the possibility of injury to the surface of the rim bead "B."

After the tube "T" is again pulled down into the interior of the cylinder 11 (FIG. 8), the operator actuates the air cylinder 23 to extend its rod 25, to lower the claws 22 and to lower the bead locking pins 43. He then flips the catch bar 38, releasing the bead catches 29 and, after swinging the claws 22 outwardly, removes the casing "C" from the apparatus. This leaves the curing tube "T" in the interior of the cylinder 11 engaged with the tube hook 62 and in position for insertion into a subsequent tire casing.

I claim:

1. Apparatus for removing a curing tube from a tire casing comprising, a generally planar casing support table, said table being inclined upwardly at its rear side, and lying in a generally horizontal attitude, a tubular chamber having an open upper end at the general center of said table with the axis of said chamber substantially normal to the plane of said table, a rim circumscribing the open end of said chamber and extending above the plane of said table, catch means for retaining a casing on said table with its lower bead circumjacent the open end of said chamber, said catch means comprising at least one outwardly directed catch at the upper side of said rim and at least one outwardly directed catch at the lower side of said rim, at least one of said catches being movable radially of said rim for engagement with the bead of said casing, means for moving said movable catch tightly into engagement with said bead, a clamp for retaining said bead in said movable catch, axially movable means engageable with the upper bead of said casing, power mechanism for moving said means axially for separating the beads of said casing, a tube hook having an outwardly extending bar bent downwardly at its outer end, and power means for moving said hook axially of said tire from an upper position in which said hook extends through the beads of a casing on said table and is adapted to engage over the exterior of a tube that is partially removed radially inwardly between said beads of said casing and a second position at the bottom of said tubular chamber.

2. Power apparatus for removing and storing a curing tube, said apparatus comprising a table inclined upwardly from the front thereof and lying in a generally horizontal attitude, an open topped tubular chamber extending downwardly from said table and having an upper rim protruding above the plane of said table, at least one radially outwardly open bead catch at the upper rear of said rim, at least one radially outwardly open radially movable bead catch at the lower front of said rim, means for moving one of said catches radially of a pneumatic casing lying on said table circumjacent to said rim for engagement with the inner side of one bead of said casing and releasable means for locking said movable bead catch in engaged position, a radially outwardly open tube hook mounted for axial movement into and out of said chamber, means for moving said hook through said chamber between a lower position near the bottom of said chamber and an upper position protruding upwardly through the center opening of said casing, axially movable members mounted on opposite sides of said chamber, upper bead engaging claws pivotally mounted on said members and adapted to be swung downwardly and inwardly over said casing and into engagement beneath the upper bead of said casing, and mechanism for moving said members upwardly for pulling said upper bead axially away from said lower bead.

3. Apparatus according to claim 2 in which the means for moving the hook through the chamber comprises a track mounted exteriorly of and parallel to the axis of said chamber, a traveller mounted on said track, the wall of said chamber having an axial slot therein aligned with said track and axis, an arm on said traveller extending through such slot into said chamber and supporting said hook inwardly thereof and means for moving said traveller along said track.

4. Apparatus according to claim 2 and a clamp cooperating with said movable bead catch for holding the lower bead of the casing tightly therebetween and means for closing said clamp.

References Cited in the file of this patent

UNITED STATES PATENTS

| | | |
|---|---|---|
| 1,482,446 | Stevens | Feb. 5, 1924 |
| 1,563,513 | McNeill | Dec. 1, 1925 |
| 1,847,349 | Maranville | Mar. 1, 1932 |
| 1,871,642 | Willshaw et al. | Aug. 16, 1932 |
| 1,897,690 | De Mattia | Feb. 14, 1933 |
| 1,948,302 | Kirk | Feb. 20, 1934 |
| 2,244,162 | Leguillon | June 3, 1941 |
| 2,477,301 | Kastner | July 26, 1949 |
| 2,668,983 | Strong et al. | Feb. 16, 1954 |
| 2,731,666 | Nebout | Jan. 24, 1956 |